(12) United States Patent
Dünki

(10) Patent No.: US 12,103,788 B2
(45) Date of Patent: Oct. 1, 2024

(54) APPARATUS FOR PROCESSING CONTAINERS

(71) Applicant: FERRUM PACKAGING AG, Schafisheim (CH)

(72) Inventor: Jürg Dünki, Dietikon (CH)

(73) Assignee: FERRUM PACKAGING AG, Schafisheim (CH)

( * ) Notice: Subject to any disclaimer, the term of this patent is extended or adjusted under 35 U.S.C. 154(b) by 105 days.

(21) Appl. No.: 17/912,431

(22) PCT Filed: Apr. 3, 2020

(86) PCT No.: PCT/EP2020/059509
§ 371 (c)(1),
(2) Date: Sep. 16, 2022

(87) PCT Pub. No.: WO2021/197611
PCT Pub. Date: Oct. 7, 2021

(65) Prior Publication Data
US 2023/0138544 A1    May 4, 2023

(51) Int. Cl.
| B65G 47/84 | (2006.01) |
| B65B 43/50 | (2006.01) |
| B65G 21/20 | (2006.01) |

(52) U.S. Cl.
CPC ............ *B65G 47/846* (2013.01); *B65B 43/50* (2013.01); *B65G 21/2072* (2013.01); *B65G 2201/0252* (2013.01); *B65G 2207/08* (2013.01)

(58) Field of Classification Search
CPC .............. B65G 47/846; B65G 2207/08; B65G 21/2072; B65G 2201/0252; B65G 29/00;
(Continued)

(56) References Cited

U.S. PATENT DOCUMENTS

| 2,645,399 A * | 7/1953 | Weidanz | B67B 3/003 |
| | | | 53/302 |
| 2008/0000582 A1* | 1/2008 | Seifert | B65G 47/24 |
| | | | 156/285 |
| 2011/0250307 A1* | 10/2011 | Quetel | B67C 3/22 |
| | | | 425/150 |

FOREIGN PATENT DOCUMENTS

| DE | 102014103632 A1 * | 9/2015 | ............. B65G 47/32 |
| DE | 202010018582 U1 * | 1/2018 | ........... B29C 49/421 |
| FR | 2937619 A1 * | 4/2010 | ......... B65G 21/2072 |

OTHER PUBLICATIONS

International Search Report issued Dec. 17, 2020 in corresponding International Application No. PCT/EP2020/059509.

* cited by examiner

*Primary Examiner* — Gene O Crawford
*Assistant Examiner* — Muhammad Awais
(74) *Attorney, Agent, or Firm* — GLOBAL IP COUNSELORS, LLP

(57) ABSTRACT

An apparatus includes a processing station with a container conveyor, a discharge apparatus including a discharge star with a carrier for transporting the containers, a discharge device arranged around the discharge star and defining a discharge curve for guiding the containers, a container inlet arranged at an end of the discharge device for receiving the containers, and a container outlet arranged at a second end of the discharge device for discharging the containers. The discharge device includes a discharge edge at the first end arranged in a region of the container conveyor such that, in the operating state, the container is received by the discharge edge into the container inlet, and the discharge star is rotatable such that the container is transported by the carrier on a guideway delimited by the discharge curve and the discharge star from the container inlet to the container outlet.

12 Claims, 5 Drawing Sheets

(58) Field of Classification Search
CPC ........... B65G 47/84; B65G 2201/0244; B65B 43/50; B65B 7/2857; B21D 51/2692; B21D 51/32; B67C 7/004; B67C 7/0046
USPC ...................................................... 198/480.1
See application file for complete search history.

APPARATUS FOR PROCESSING CONTAINERS

CROSS-REFERENCE TO RELATED APPLICATION

This application is a U.S. National Stage application of International Application No. PCT/EP2020/059509, filed Apr. 3, 2020, the contents of which is hereby incorporated by reference.

BACKGROUND

Field of the Invention

The disclosure relates to an apparatus for processing containers. The disclosure further relates to a discharge apparatus and to a method for adapting the apparatus for processing containers.

Background Information

When filling beverage cans or food cans, the cans pass through a can sealer after being filled with the beverage or food, wherein the filled can bodies enter via a feed path and can lids enter via a further feed path. A conventional can sealer usually has several similar stations arranged in a carousel shape, in each of the stations a can is sealed with a can lid. The can lids are guided onto the can bodies and held on the can body with a holding plate of a seaming head. This holding also serves to fix the cans against breaking out due to centrifugal force of the circular path through which the cans pass in the can sealer. The can bodies are seamed with the can lid via a seaming roller at the edges and thus sealed in the can sealer. Normally, the can with the can lid is additionally rotated around its own axis of symmetry by the seaming head. For rotation, the seaming rollers and seaming heads are arranged on a respective seaming shaft.

A conventional can sealer is disclosed in DE 749636 and DE 4234115 A1. These conventional can sealers comprise a clamping device for receiving a can to be sealed. In the operating state, the can to be sealed is introduced into the clamping device and secured in the axial and radial directions. A can lid is also introduced centered over the can opening of the can to be sealed. The can has a circumferential can flange in the region of the can opening and the can lid has a circumferential can lid flange. For sealing the can opening by the can lid, the can sealer additionally comprises two seaming rollers, each mounted rotatably about an axis, which press the can flange and the can lid flange together by a force acting substantially radially, the pressing being effected by a continuous rolling in the circumferential direction along the circumference of the can opening.

A further conventional can sealer is disclosed in GB 298899 A. This conventional can sealer comprises a clamping device for receiving the can to be sealed and a seaming roller. In the operating state, the can to be sealed is introduced into the clamping device and secured by it in axial and radial direction. A can lid is also introduced centered over the can opening of the can to be sealed. The can has a circumferential can flange in the region of the can opening of the can body and the can lid has a circumferential can lid flange.

The transfer or discharge of the cans from the stations arranged in a carousel shape is usually carried out via a discharge apparatus with a so-called discharge star and a discharge curve, whereby the can is received from the corresponding station by the discharge curve and discharged by the discharge star to be guided to another processing station.

Different container shapes can be sealed with a single sealer or filled with a single filler. To adapt the discharge apparatus to the different container formats, both the discharge star and the discharge curve must be exchanged.

SUMMARY

It has been determined that a substantial disadvantage of the conventional apparatuses is that the change of the discharge curve and the discharge star is time-consuming and complicated, which can lead to long standstill times.

It is therefore an object of the present disclosure to provide an apparatus for processing containers which avoids the adverse effects known from the state of the art. In particular, an apparatus for processing containers is to be provided, by which standstill times due to a tool change can be significantly reduced.

This object can be met by an apparatus according to the disclosure for processing containers and a discharge apparatus for an apparatus for processing containers and by the method for adapting the apparatus for processing containers.

According to an embodiment of the invention, an apparatus for processing containers is proposed, comprising a processing station with a container conveyor for moving the container through the processing station and a discharge apparatus for discharging the container from the processing station. Here, the discharge apparatus comprises a discharge star with a carrier for transporting the containers; a discharge device arranged around the discharge star, which discharge device defines a discharge curve for guiding the containers, a container inlet arranged at a first end of the discharge device for receiving the containers from the processing station; and a container outlet arranged at a second end of the discharge device for discharging the containers from the discharge apparatus. The discharge device comprises a discharge edge at the first end, which discharge edge is arranged in a region of the container conveyor in such a way that, in the operating state, the container can be received by the discharge edge from the processing station into the container inlet. The discharge star is arranged to be rotatable about an axis in such a way that the container can be transported by the carrier of the discharge star on a guideway delimited by the discharge curve and the discharge star from the container inlet to the container outlet.

The embodiment is characterized in that the discharge device is arranged to be displaceable in a radial direction extending orthogonal to the axis in such a way that the discharge edge can be moved relative to the container conveyor. In this way, the discharge edge can be moved further to the region of the container conveyor or away from the region of the container conveyor. In doing so, it is possible that different types of containers with different sizes, in particular different radii (i.e. different container formats) can be received without having to exchange the discharge device. If the discharge edge is moved further to/into the region of the container conveyor, larger containers can be received (from the discharge apparatus) in this way. If the discharge edge is moved away from the region of the container conveyor, smaller containers can be received (from the discharge apparatus) in this way.

This means in particular that the discharge curve of the discharge device is a curved recess in the discharge device. The recess can have any suitable shape, such as the shape of a semicircle.

The operating state is considered to be the state in which containers are moved through the processing station by the container conveyor.

Particularly preferred, the discharge star with the discharge device is arranged to be displaceable in the radial direction. In particular, the discharge star and the discharge device can be movable synchronously, for which purpose the discharge star and the discharge device can be coupled via a connecting part.

The discharge star preferably comprises a plurality of carriers for transporting a plurality of containers. The carriers are preferably evenly distributed around the discharge star.

The discharge apparatus can comprise a discharge rail arranged at the container outlet. Due to this discharge rail, tilting of the containers after leaving the delimited guideway (i.e. behind the discharge curve) is prevented, as the discharge rail acts as a guard railing for the containers. In this case, the discharge rail can comprise in particular a first discharge rail attached to the second end of the discharge device. If the first discharge rail is attached to the second end of the curve, the first discharge rail is also displaced when the discharge device is displaced. In this way, the discharge rail is also adapted to a new alignment of the discharge device when changing the format (changing the container size/container radius).

In addition, the discharge rail can comprise a second discharge rail arranged opposite the first discharge rail, which second discharge rail is arranged to be displaceable in the radial direction in such a way that the second discharge rail can be moved relative to the container conveyor. A discharge track (between the discharge rails) is defined by the second discharge rail in combination with the first discharge rail. Since both the first discharge rail and the second discharge rail can be moved, the discharge track can be adapted to the new alignment of the discharge device during the format change. In particular, the first and second discharge rail can be movable in a coupled manner so that they are moved synchronously. As an alternative, the second discharge rail can be moved independently of the first discharge rail by a separate displacement unit. This makes it possible, when changing a format, that the discharge track is not only realigned with the discharge device, but it is also adapted to the new format by varying a width of the discharge track.

In addition, the discharge apparatus can comprise a discharge belt arranged at the container outlet for guiding the containers away from the discharge apparatus. The discharge belt is preferably arranged at (below) the discharge track.

In practice, the discharge apparatus can comprise a drive for rotating the discharge star, wherein the discharge star is connected to the drive via a star shaft. In order to facilitate the movement of the discharge star, the star shaft can be connected to the drive via a parallel crank coupling, so that the discharge star can be moved in the radial direction relative to the drive without having to move the drive as well. The parallel crank coupling can be designed in particular as a Schmidt coupling. The parallel crank coupling/ Schmidt coupling connects a drive shaft of the drive with the star shaft. Both the parallel crank coupling and the Schmidt coupling are already known in the state of the art.

The parallel crank coupling enables a large radial displacement (displacement in the radial direction) of the star shaft and the drive shaft. It particularly comprises two clutch disks, each of which is connected to a central disk by two parallel control levers. The parallel crank coupling enables an angularly accurate transmission of torque. Due to the Schmidt coupling, the star shaft and the drive shaft can be radially adjusted and still be driven. The Schmidt coupling usually comprises three disks arranged in parallel, which are connected via several control levers. During rotation of a disk, the rotational movement is transmitted absolutely uniformly and thus at the same angle to the next disk by three or more control levers during the rotation by building up alternating tensile and compressive forces.

In the case of an embodiment of the invention, the processing station is designed as a sealer, in particular as a can sealer. The container conveyor preferably is of rotary design, and the apparatus is arranged in the form of an upright shaft.

According to the present disclosure, a discharge apparatus for the container processing apparatus is further proposed, comprising the discharge star with the carrier for transporting the containers; the discharge device arranged around the discharge star, which discharge device defines the discharge curve for guiding the containers; the container inlet arranged at the first end of the discharge device for receiving the containers; and the container outlet arranged at the second end of the discharge device for discharging the containers from the discharge apparatus. The discharge device comprises the discharge edge at the first end and the discharge star is arranged to be rotatable about the axis in such a way that the container can be transported by the carrier of the discharge star on a guideway delimited by the discharge curve and the discharge star from the container inlet to the container outlet. The discharge apparatus is characterized in that the discharge device is arranged to be displaceable in a radial direction extending orthogonal to the axis. The discharge apparatus preferably is a discharge apparatus for an apparatus according to the present disclosure.

According to the present disclosure, a method for adapting the apparatus according to the present disclosure to the container format of the container is further proposed. This means that the method serves to adapt the apparatus to the format change. In this respect, the apparatus according to the present disclosure is provided and the discharge device is displaced in the radial direction extending orthogonal to the axis so that the discharge edge is moved relative to the container conveyor. In particular, the discharge star can also be exchanged for the format change.

As mentioned above, the apparatus according to the present disclosure is preferably designed as a can sealer. The container can be a can with a can lid, which are seamed together by the can sealer. For sealing the can, the can sealer preferably comprises one or a plurality of seaming rollers (as known from the state of the art) and a seaming head. In the operating state, the seaming rollers with their respective seaming profiles are brought into contact with a can lid flange of the can lid and a can flange of the can. By rotating the can, the seaming roller is then rotated in the circumferential direction of the can, seaming the can flange to the can lid flange. To rotate the can, the can is preferably clamped between the seaming head and a support, whereby the seaming head is rotated around the seaming axis by the seaming shaft.

Within the framework of the present disclosure, the can be understood to be a rotationally symmetrical container which is sealed by the can sealer and the associated seaming roller. A can preferably comprise a metal, in particular steel or aluminum.

In principle, the sealer according to the present disclosure can be analogous to the can sealers already known from the state of the art but can differ in the discharge apparatus.

Here, this results in the advantage that known can sealers/ sealers can be modified with the discharge apparatus according to the present disclosure to avoid the disadvantages of the state of the art in this way.

In practice, the can sealer comprises, as in the state of the art, a clamping device including a seaming head and a support, with which the can is fixed in the axial and radial direction for sealing and can be rotated in the circumferential direction.

In principle, the sealer can preferably comprise at least two seaming rollers, preferably with different seaming profiles, so that cans can be sealed according to the double seam principle, in which the cans are generally sealed in two stages. One seaming roller is responsible for each step. The first seaming roller makes a pre-seam, while the second seaming roller completely seals the can.

BRIEF DESCRIPTION OF THE DRAWINGS

Embodiments of the invention will be explained on more detail hereinafter with reference to the drawings.

DETAILED DESCRIPTION

Figure 1:
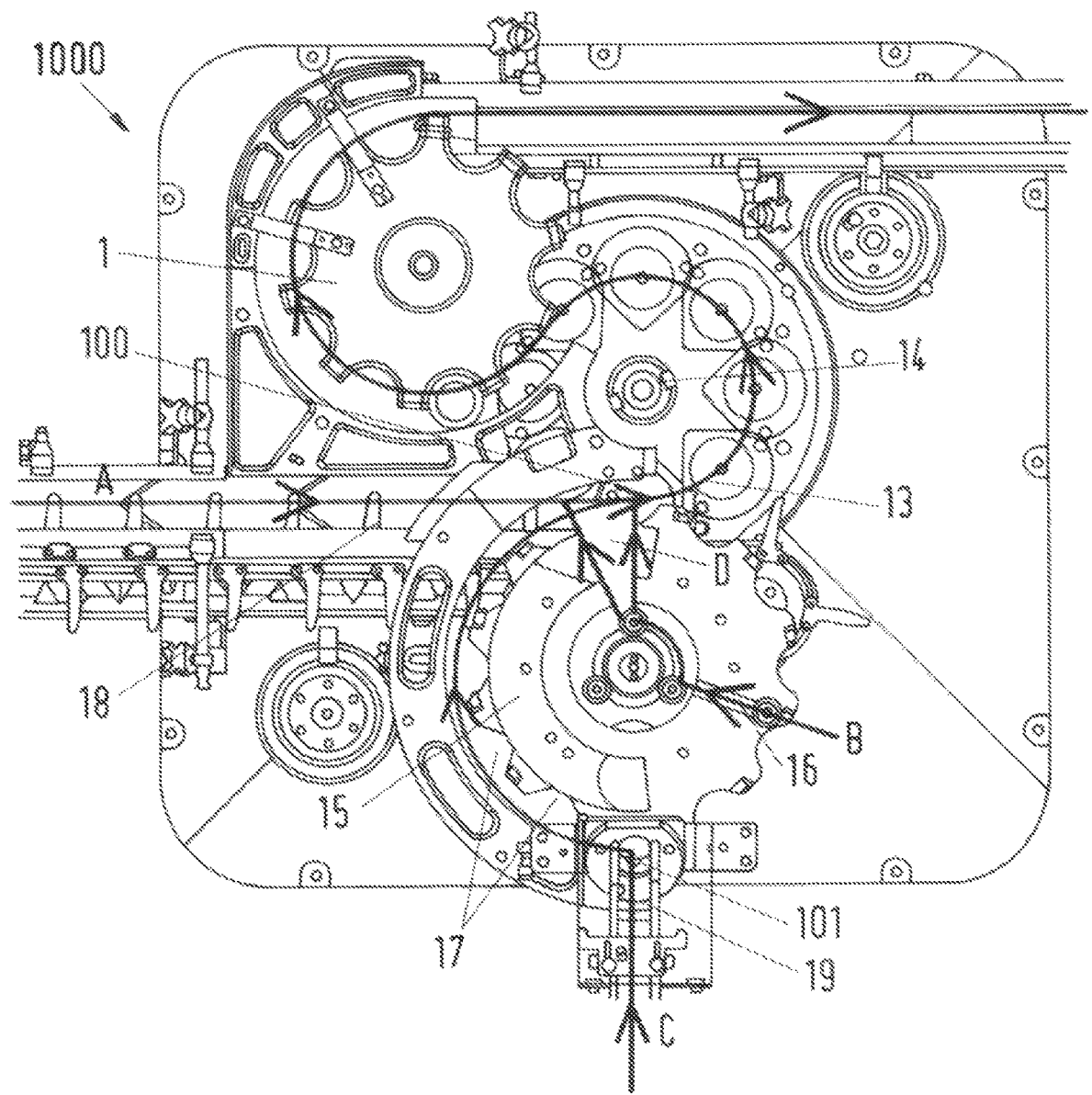
FIG. 1 illustrates a plan view of an apparatus according to an embodiment of the invention.

FIG. 1 shows a plan view of an apparatus 100 according to an embodiment of the invention, designed as a sealer arrangement 1000.

The sealer arrangement 1000 for sealing a container 100 comprises a lid feeding device 19 for feeding a lid 101 to the container 100, a gassing device 1 for supplying gas to the container 100 and a processing station (here a sealer 14) for sealing the container 100 by the lid 101.

In the embodiment shown, the sealer 14 is preferably designed as a can sealer 14. The container 100 is a can 100, which is seamed in the can sealer 14.

In the operating state, the lid 101 is introduced along the arrow C by the lid feeding device 19 into the sealer arrangement 1000. In doing so, the lids 101 are arranged on a gassing rotor 15. The lids 101 are transported further by rotating the gassing rotor 15. Subsequently, the containers 100 are introduced by the container feeder 18 into the container receptacles 17 of the gassing rotor 15. There, the container 100 is gassed with a gas such as carbon dioxide or nitrogen in the region D and combined with the lid 101.

Gassing takes place along the arrow B with the gas supply 16. After gassing, the container 100 with the lid 101 is transported by the container conveyor 13 through the sealer 14 and is sealed there. Subsequently, the container 100 is discharged from the sealer 14 by a discharge apparatus 1.

Figure 2:
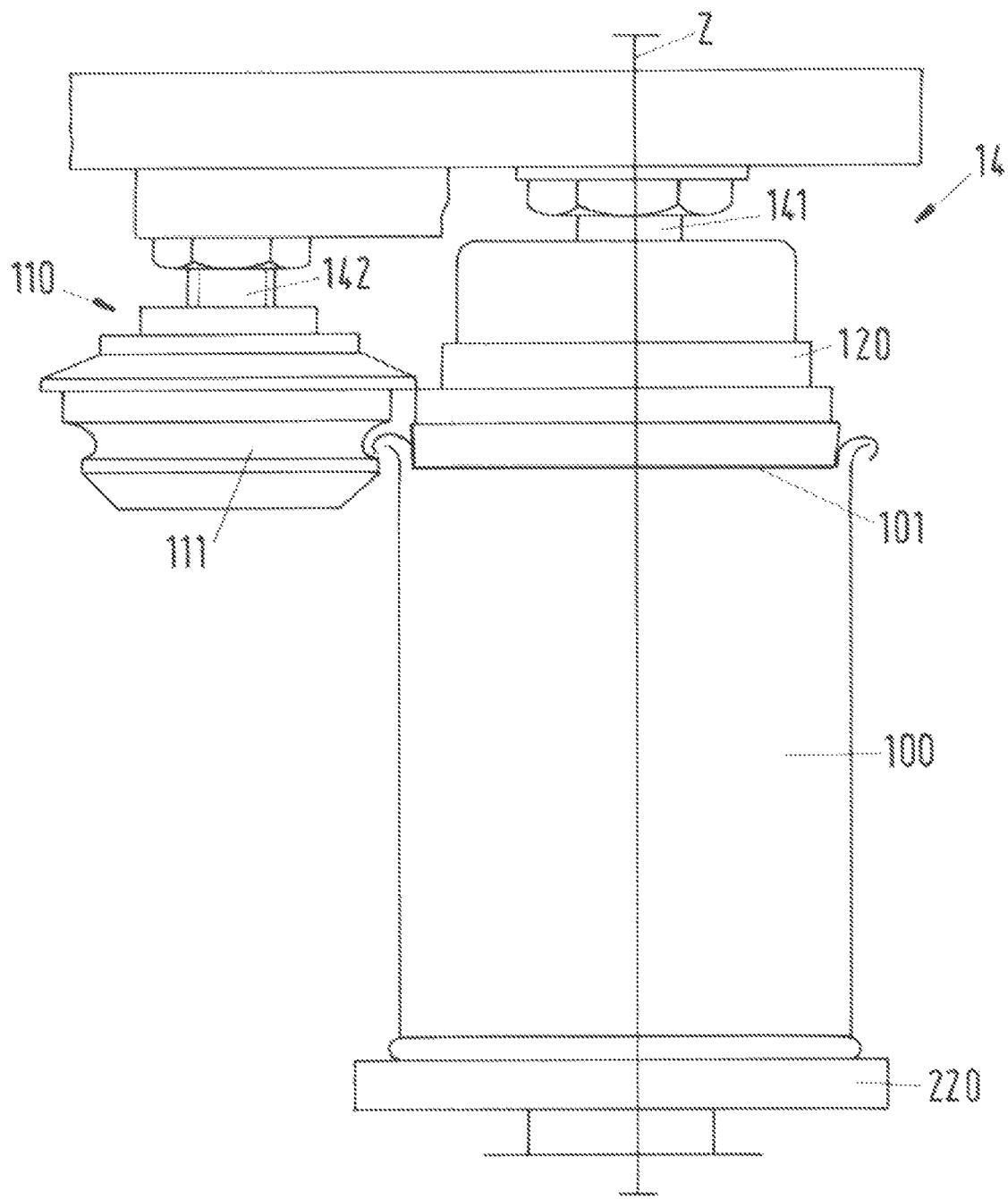
FIG. 2 illustrates a side view of a can sealer.

FIG. 2 shows a side view of a can sealer 14 with a can 100 to be sealed and a can lid 101.

According to FIG. 2, the can sealer 14 comprises a clamping device comprising a can support 220 and a seaming head 120, and a seaming roller 110 with a seaming roller profile 111 rotatably mounted around the seaming shaft 142. The can lid 101 is arranged in a centered way above the opening of the can 100. The can 100 has a circumferential can flange in the region of the can opening and the can lid 101 has a circumferential can lid flange.

During the sealing process, the seaming roller 110 is brought into contact with the can flange and the can lid flange via the seaming roll profile 111. Here, the can flange and the can lid flange are pressed together via the seaming roller 110 by a force acting substantially radially. The pressing is achieved by a continuous rolling of the seaming roller 110 in the circumferential direction along the circumference of the can opening. By seaming the can 100 with the can lid 101, a double seam is preferably created.

For seaming, the can 100 is rotated by the clamping device by rotating the seaming head 120 with the seaming roller 141 about the seaming axis Z.

Figure 3A:
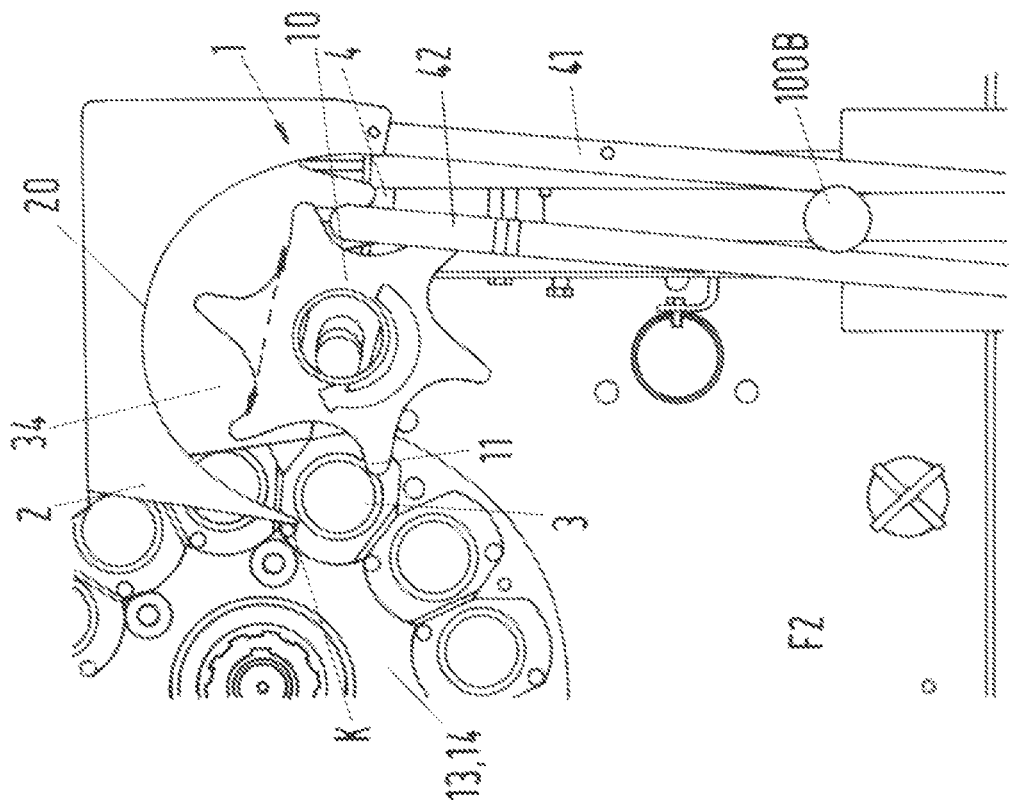
FIGS. 3A and 3B illustrate plan views of a discharge apparatus according to an embodiment of the invention.
Figure 3B:
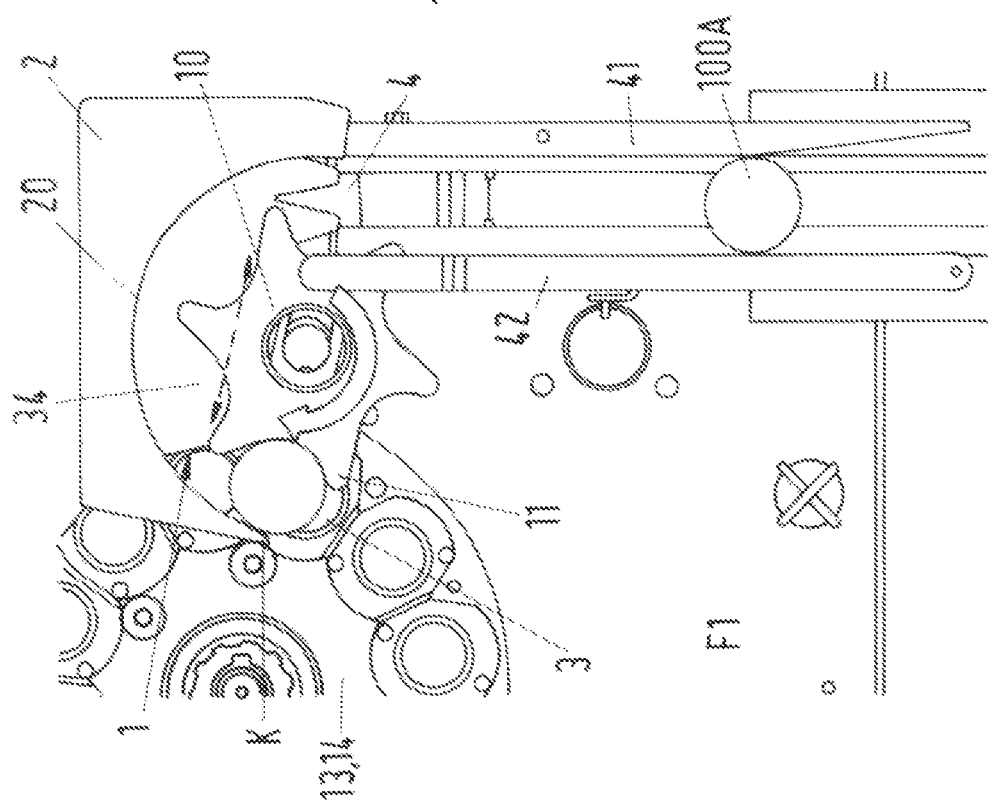

FIGS. 3A and 3B show a plan view of a discharge apparatus 1 according to an embodiment of the invention.

The processing station with a container conveyor 13 is designed as a can sealer 14. The container conveyor 13 moves the cans 100 through the can seamer 14.

The discharge apparatus 1 for discharging the cans 100 from the can sealer 14 comprises a discharge star 10 with a plurality of carriers 11 for transporting a plurality of cans 100. A can receptacle is defined between two carriers 11.

In addition, the discharge apparatus 1 comprises a discharge device 2 arranged around the discharge star 10, which discharge device 2 defines a discharge curve 20 for guiding the cans 100. A container inlet 3 is arranged at a first end of the discharge device 2 for receiving the cans 100 from the can sealer 14. A container outlet 4 is arranged at a second end of the discharge device 2 for discharging the cans 100 from the discharge apparatus 1.

The discharge device 2 comprises a discharge edge K at the first end (at the container inlet 3). The discharge edge K is arranged in a region of the container conveyor 13 in such a way that, in the operating state, cans 100 are received by the discharge edge K from the can sealer 14 into the container inlet 3.

The discharge star 10 is arranged to be rotatable about an axis in such a way that the cans 100 can be transported by the carrier 11 on a guideway 34 delimited by the discharge curve 20 and the discharge star 10 from the container inlet 3 to the container outlet 4.

The discharge device 2 is arranged to be displaceable in a radial direction extending orthogonal to the axis about which the discharge star 10 rotates in the operating state, in such a way that the discharge edge K can be moved relative to the container conveyor.

In this way, the discharge edge K can be moved further to the region of the container conveyor 13 or away from the region of the container conveyor 13.

As a result, it is enabled that different types of cans 100 with different sizes, in particular different radii, can be received without having to exchange the discharge device 2. In FIGS. 3A and 3B, two different can formats are shown: can 100 with format 100A (FIG. 3A) and can 100 with format 100B (FIG. 3B), wherein the discharge apparatus is set to configuration F1 (FIG. 3A) for can format 100A and configuration F2 (FIG. 3B) for can format 100B.

The discharge star 10 (also starwheel) and the discharge device 2 can be displaced synchronously in the radial direction.

For a smaller can format (when changing to a smaller can format) such as 100B, the discharge edge K is moved away from the container conveyor 13, thus allowing a smaller can 100B (from the discharge apparatus 1) to be received and discharged. For this purpose, the discharge star 10 and the discharge device 2 are displaced along the dotted double arrow (to the right with view to FIGS. 3A and 3B).

For a larger can format (when changing to a larger can format) such as 100A, the discharge edge K is moved to the container conveyor 13, thus allowing a larger can 100A (from the discharge apparatus 1) to be received and discharged. For this purpose, the discharge star 10 and the discharge device 2 are displaced along the dotted double arrow (to the left with view to FIGS. 3A and 3B).

The discharge star 10 and the discharge device 2 are preferably coupled via a connecting part for the synchronous displacement.

A first and a second discharge rail 41, 42 are arranged at the container outlet 4. Due to this discharge rails 41, 42, tilting of the cans 100 after leaving the delimited guideway (i.e. behind the discharge curve 20) is prevented.

The first discharge rail 41 is attached to the second end of the discharge device 2. Thus, the first discharge rail 41 is also displaced when the discharge device 2 is displaced. In this way, the discharge rail 41 is also adapted to a new alignment of the discharge device 2 during the format change (change from 100A to 100B).

The second discharge rail 42 is arranged opposite the first discharge rail 41. The second discharge rail 42 is arranged to be displaceable in the radial direction in such a way that the second discharge rail 42 can be moved relative to the container conveyor. The second discharge rail 42 can be moved independently of the first discharge rail 41 by a separate displacement unit.

Due to the second discharge rail 42 in combination with the first discharge rail 41, a discharge track is defined which can be varied in its width by displacing the second discharge rail 42, thus enabling an adaption of the discharge track to different can formats.

Figure 4:
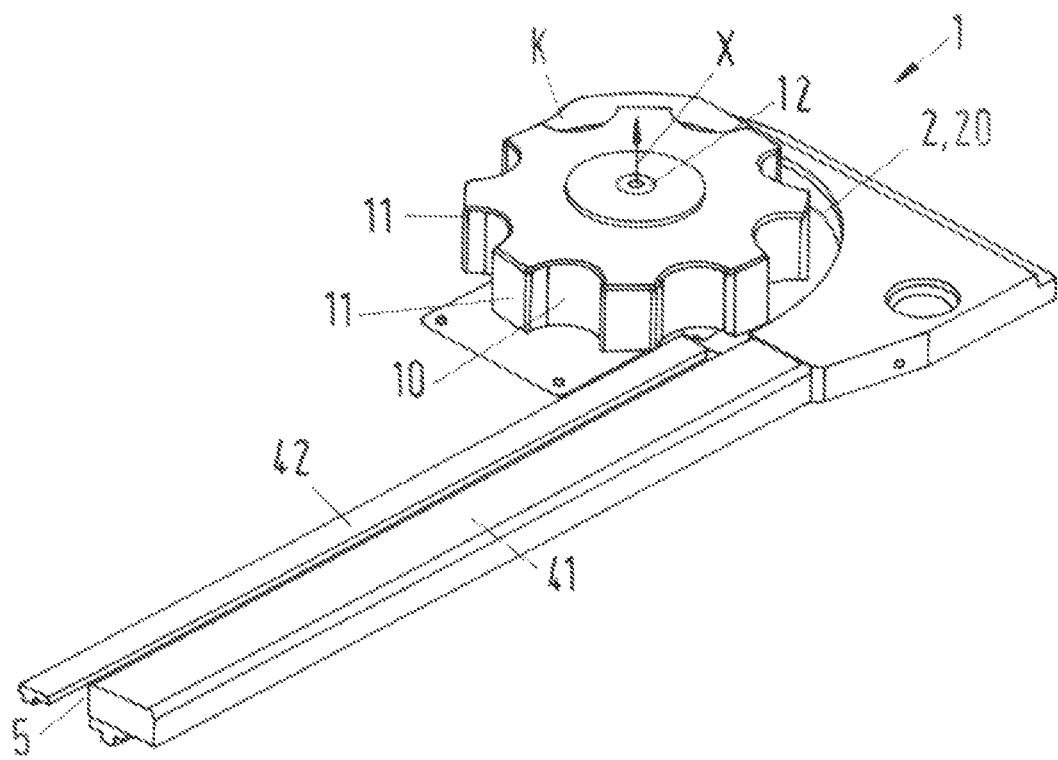
FIG. 4 illustrates a perspective representation of the discharge apparatus according to an embodiment of the invention.

FIG. 4 shows a perspective representation of the discharge apparatus 1 according to the disclosure according to FIGS. 3A and 3B.

The discharge star 10 is coupled to the drive shaft via its star shaft 12, so that the discharge star 10 can be rotated around the axis X in the operating state in such a way that the cans can be transported by the carriers 11.

The discharge rails 41 and 42 are arranged opposite each other. Due to the second discharge rail 42 in combination with the first discharge rail 41, the discharge track 5 is thus formed which can be varied in its width by displacing the second discharge rail 42. In principle, the discharge track 5 can comprise a discharge belt on which the cans can be guided.

Figure 5:
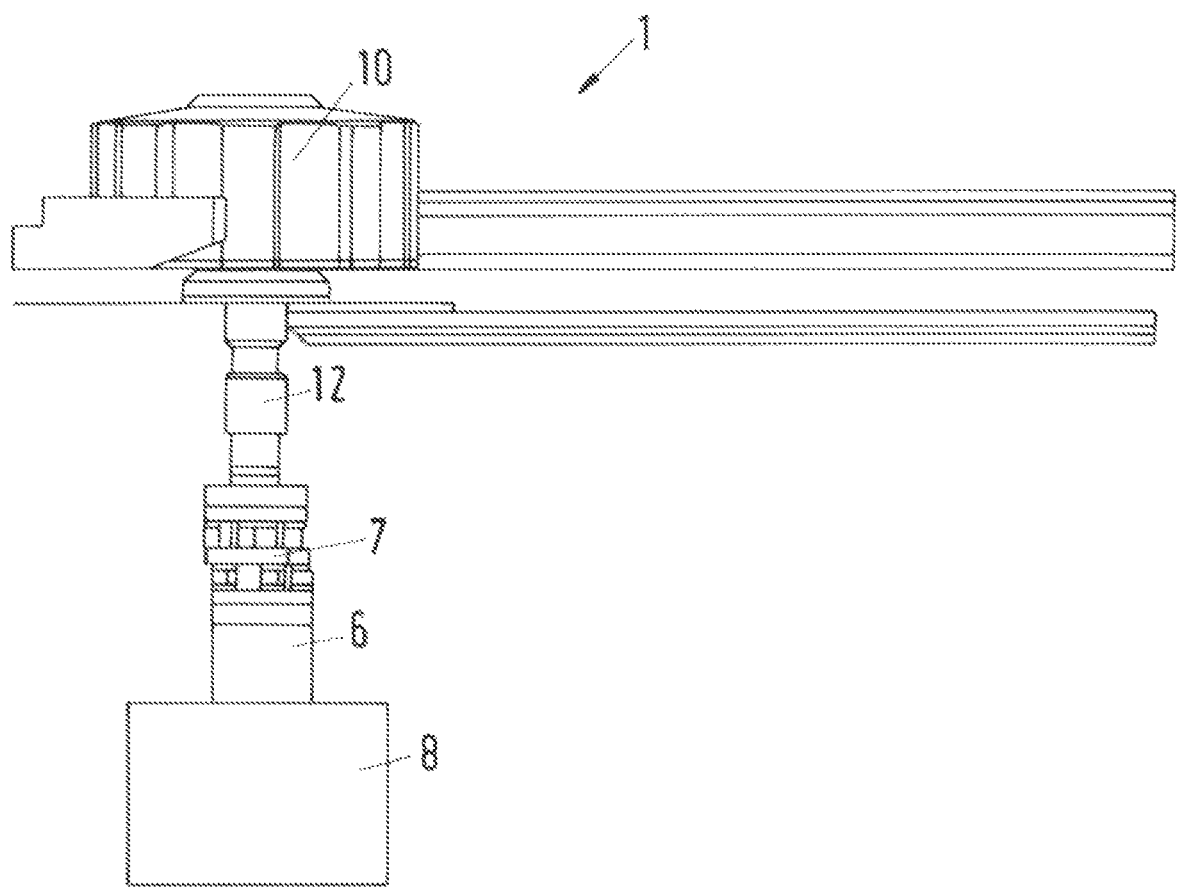
FIG. 5 illustrates a further representation of the discharge apparatus according to an embodiment of the invention.

FIG. 5 shows a further representation of the discharge apparatus 1 according to the disclosure.

The discharge apparatus 1 shown comprises the drive 8 for rotating the discharge star 10. The discharge star 10 is connected to the drive 8 via the star shaft 12. In order to facilitate the movement/displacement of the discharge star, the star shaft 12 is connected to the drive shaft 6 via a Schmidt coupling 7 and thus to the drive 8, so that the discharge star 10 can be moved in the radial direction relative to the drive 8 without having to move the drive 8 as well.

The invention claimed is:

1. An apparatus for processing containers comprising:
    a processing station with a container conveyor configured to move the container through the processing station, and
    a discharge apparatus configured to discharge the container from the processing station, the discharge apparatus comprising a discharge star with a carrier configured to transport the containers;
    a discharge device arranged around the discharge star, the discharge device defining a discharge curve configured to guide guiding the containers;
    a container inlet arranged at a first end of the discharge device and configured to receive the containers from the processing station; and
    a container outlet arranged at a second end of the discharge device and configured to discharge the containers from the discharge apparatus,
    the discharge device comprising a discharge edge at the first end, the discharge edge arranged in a region of the container conveyor such that, in an operating state, the container is capable of being received by the discharge edge from the processing station into the container inlet, and the discharge star is arranged to be rotatable about an axis such that the container is capable of being transported by the carrier of the discharge star on a guideway delimited by the discharge curve and the discharge star from the container inlet to the container outlet, and
    the discharge star with the discharge device arranged to be displaceable in a radial direction extending orthogonal to the axis such that the discharge edge is capable of being moved relative to the container conveyor, and such that the discharge apparatus is capable of accommodating different container formats.

2. The apparatus according to claim 1, wherein the carrier is one of a plurality of carriers, the container is one of a plurality of containers and the plurality of carriers is configured to transport the plurality of containers.

3. The apparatus according to claim 1, wherein the discharge apparatus comprises a discharge rail arranged at the container outlet to guide the container.

4. The apparatus according to claim 3, wherein the discharge rail comprises a first discharge rail attached to the second end of the discharge device.

5. The apparatus according to claim 4, wherein the discharge rail comprises a second discharge rail arranged opposite the first discharge rail, the second discharge rail is arranged to be displaceable in the radial direction such that the second discharge rail is capable of being moved relative to the container conveyor.

6. The apparatus according to claim 1, wherein the discharge apparatus comprises a discharge belt arranged at the container outlet to guide the container away from the discharge apparatus.

7. The apparatus according to claim 1, wherein the discharge apparatus comprises a drive configured to rotate the discharge star, the discharge star being connected to the drive via a star shaft.

8. The apparatus according to claim 7, wherein the star shaft is connected to the drive via a parallel crank coupling so that the discharge star is capable of being in the radial direction relative to the drive.

9. The apparatus according to claim 8, wherein the parallel crank coupling is a Schmidt coupling.

10. The apparatus according to claim 1, wherein the processing station is a sealer.

11. A discharge apparatus for an apparatus for processing containers, comprising:
    a discharge star with a carrier configured to transport containers;
    a discharge device arranged around the discharge star, the discharge device defining a discharge curve configured to guide the containers;

a container inlet arranged at a first end of the discharge device to receive the containers; and a container outlet arranged at a second end of the discharge device to discharge the containers from the discharge apparatus;

the discharge device comprising a discharge edge at the first end, and the discharge star is arranged to be rotatable about an axis such that the containers are capable of being transported by the carrier of the discharge star on a guideway delimited by the discharge curve and the discharge star from the container inlet to the container outlet, the discharge star with the discharge device arranged to be displaceable in a radial direction extending orthogonal to the axis, such that the discharge apparatus is capable of accommodating different container formats.

12. A method for adapting the apparatus according to claim 1, comprising:

providing the apparatus; and displacing the discharge device in the radial direction extending orthogonal to the axis so that the discharge edge is moved relative to the container conveyor.

* * * * *